Jan. 24, 1956 C. B. SPEEDY 2,732,516

VACUUM TUBE GATES AND GATING CIRCUITS

Filed Aug. 30, 1954 4 Sheets-Sheet 1

VACUUM TUBE GATES AND GATING CIRCUITS

Filed Aug. 30, 1954 4 Sheets-Sheet 2

Jan. 24, 1956 C. B. SPEEDY 2,732,516

VACUUM TUBE GATES AND GATING CIRCUITS

Filed Aug. 30, 1954 4 Sheets-Sheet 4

United States Patent Office 2,732,516

Patented Jan. 24, 1956

2,732,516

VACUUM TUBE GATES AND GATING CIRCUITS

Charles Brian Speedy, London, England, assignor to Commonwealth Scientific and Industrial Research Organization, East Melbourne, Victoria, Australia, a body corporate Application August 30, 1954, Serial No. 452,841

Claims priority, application Australia September 8, 1953

10 Claims. (Cl. 315—13)

This invention relates to vacuum tube gates and gating circuits.

In electronic digital computing and switching systems the use of gating circuits is frequently essential or desirable. The present invention is based on the observation that a computing or switching system need consist only of different combinations of three basic elements, these being a bi-stable element, a gate element, and an isolating element or diode. It has been further observed that in applying these elements the interconnections are always bi-stable elements used to control gates, gate outputs to trigger bi-stable elements, or gate outputs to other gate inputs. In addition diodes are necessary for isolation of parallel input and output elements.

This particular function of bi-stable elements controlling gates is of fundamental importance in digital computing circuits and normally requires the use of a number of conventional grid-controlled vacuum tubes of the type used in radio receivers.

The object of this invention is to provide for this function with a single vacuum tube in a circuit requiring few additional components, and which is not subject to critical tolerances either in component values or input levels.

The vacuum tube of this invention is designed for use as a bi-stable element controlling one or two gates. If two gates are provided the preferred arrangement is one in which they are controlled by the bi-stable element so that when one gate is open the other is closed, and vice versa. The vacuum tube has the additional advantage that the various control and output electrodes may be operated at the same normal D. C. level allowing direct interconnection between input electrodes and gate outputs.

According to this invention an electron beam vacuum tube gate device comprises means for generating an electron beam, means for effectively dividing the electron beam into two sections; a bi-stable element including the first section of the electron beam and a divided target electrode cross-connected to a first pair of deflecting electrodes, said first pair of deflecting electrodes also operating to deflect the second section of the electron beam, a second pair of deflecting electrodes for the said first section of the electron beam, means for applying control signals to said second pair of deflecting electrodes whereby to shift the electron beam from one stable state where it falls on one part of the divided target to the other stable state where it falls on the other part of the divided target; a gating element including the second section of the electron beam, the said first pair of deflecting electrodes, a divided target electrode for the said second section of the electron beam, and a further pair of deflecting electrodes for the said second section of the electron beam, the division between the parts of the last-mentioned target electrode and the potentials applied to the deflecting electrodes being such that in the absence of signals applied to the said further pair of deflecting electrodes the said second portion of the electron beam falls on the same part of the target electrode in both of its stable positions, and means for applying gating signals to the said further deflecting electrodes whereby when the electron beam is in one stable state the gating signals transfer the said second section of the electron beam from the aforesaid "same" part of the target electrode for the gating element to the other part but when the electron beam is in the other stable state the gating signals do not so transfer the said second section of the electron beam.

From another aspect an electron beam vacuum tube gate device according to this invention comprises means for generating an electron beam, means for effectively dividing the electron beam into two sections, a first pair of deflecting electrodes associated with both sections of the electron beam, a second pair of deflecting electrodes associated with the first section of the electron beam, a target for the first section of the electron beam divided into two parts so that when all deflecting electrodes are at the same potential the said first section divides approximately equally between the said parts, resistances between the target parts and a high tension source, cross-connections between the said target parts and the said first pair of deflecting electrodes such that a target part on one side of the electron beam in its undeflected state is connected to the deflecting electrode of the said first pair on the opposite side, means for applying control signals to the said second pair of deflecting electrodes, whereby to provide a bi-stable element, a third pair of deflecting electrodes associated with the said second section of the electron beam, a target electrode for the second section of the electron beam divided into two parts such that when the bi-stable section is in one stable state the said second section of the electron beam falls on one part adjacent the division between the two parts and when the bi-stable section is in the other stable state the said second section of the electron beam falls on the said one part well away from the said last-mentioned division, means for applying gating signals to the said third pair of deflecting electrodes to deflect the said second section of the electron beam toward the second part of the last-mentioned target electrode, and means for deriving an output from the said last-mentioned second part.

From yet another aspect an electron beam vacuum tube for use in gating circuits comprises an electron gun for generating a rectangular electron beam, means adapted effectively to divide the electron beam into two sections, a first pair of deflecting electrodes extending substantially the full length of the electron beam, a second pair of deflecting electrodes above the said dividing means, a first target electrode above the said dividing means which is divided into two parts by a centrally disposed division parallel to the longer dimension of the electron gun, a third pair of deflecting electrodes below the said dividing means, and a second target electrode below the said dividing means which is divided into two parts by a division which is parallel to, but off-set with relation to the division in the first-mentioned target electrode.

Reference will now be made to the accompanying drawings in which.

Figure 1:
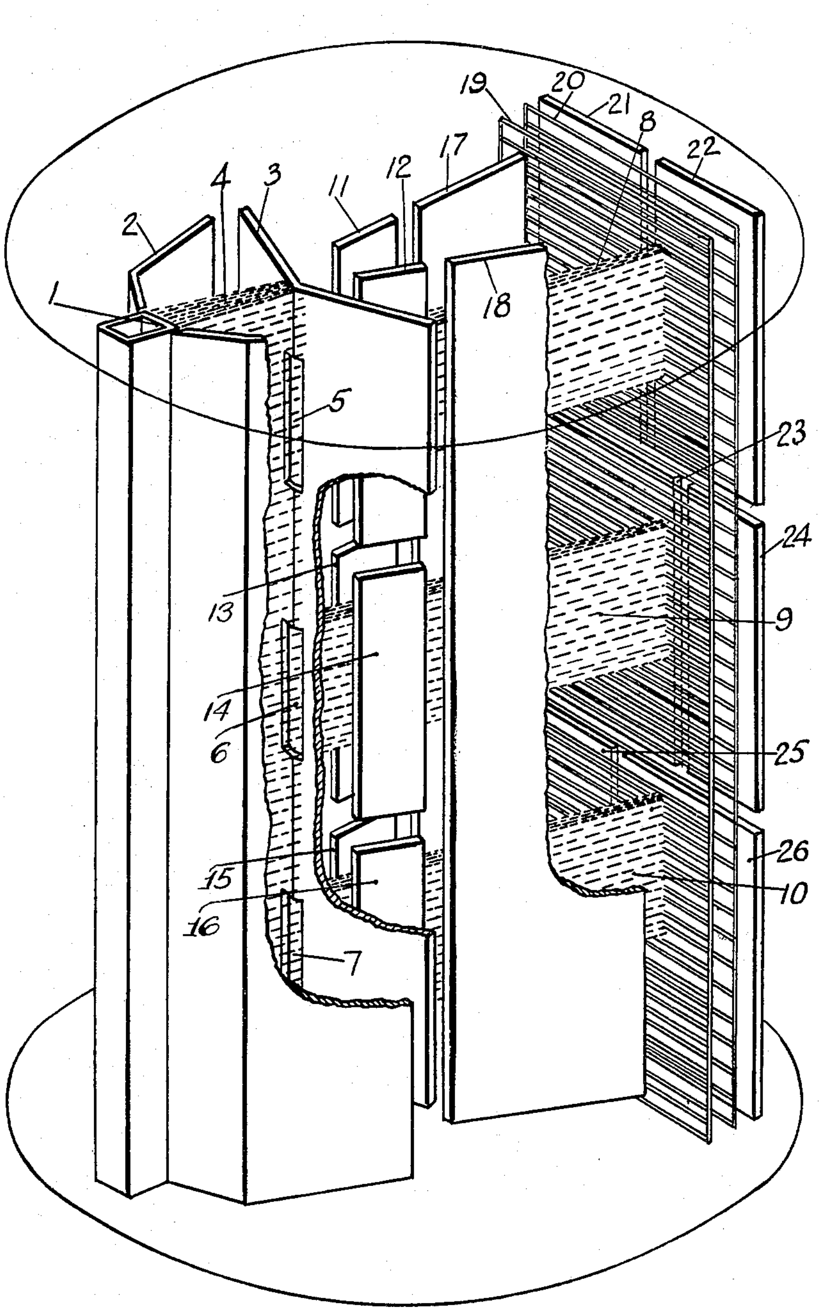
Figure 1 is a perspective view of a gating vacuum tube according to this invention which includes a bi-stable element and two gating elements.

Figure 1 shows the general arrangement of electrodes in one form of vacuum tube including a bi-stable element controlling two gates. An indirectly heated cathode 1 in conjunction with a cathode shield 2 and anode 3 constitutes a Pierce electron gun producing a rectangular beam of electrons 4. The anode is slotted at 5, 6, 7 to produce three separate electron beams 8, 9, 10. A pair of deflecting elce 1re ot1d,s z35Rv
of deflecting electrodes 11, 12 is associated with the first or upper beam 8, a pair of deflecting electrodes 13, 14 with the second or middle beam 9, and a pair of deflecting electrodes 15, 16 with the third or lower beam 10. A fourth pair of deflecting electrodes 17, 18 is provided which affects all electron beams 8, 9, 10. Screen and suppressor grids 19, 20 are provided.

Each beam 8, 9, 10 is provided with an output target which is divided longitudinally (i. e. in the same direction as the length of the electron beam) into two parts. One of the target electrodes, in this case the first or upper target, is divided centrally into the parts 21, 22. The division of the other two targets is offset with respect to that of target parts 21, 22. The division of the second target into the parts 23, 24 falls on one side of the division of the first target and the division of the third target into the parts 25, 26 falls on the other side of the division of the first target. With no deflecting voltages applied to any of the deflecting electrodes 11 to 18 the upper beam 8 divides substantially equally between target parts 21, 22 while beam 9 falls wholly on target part 23 and beam 10 falls wholly on target part 26.

Figure 2:
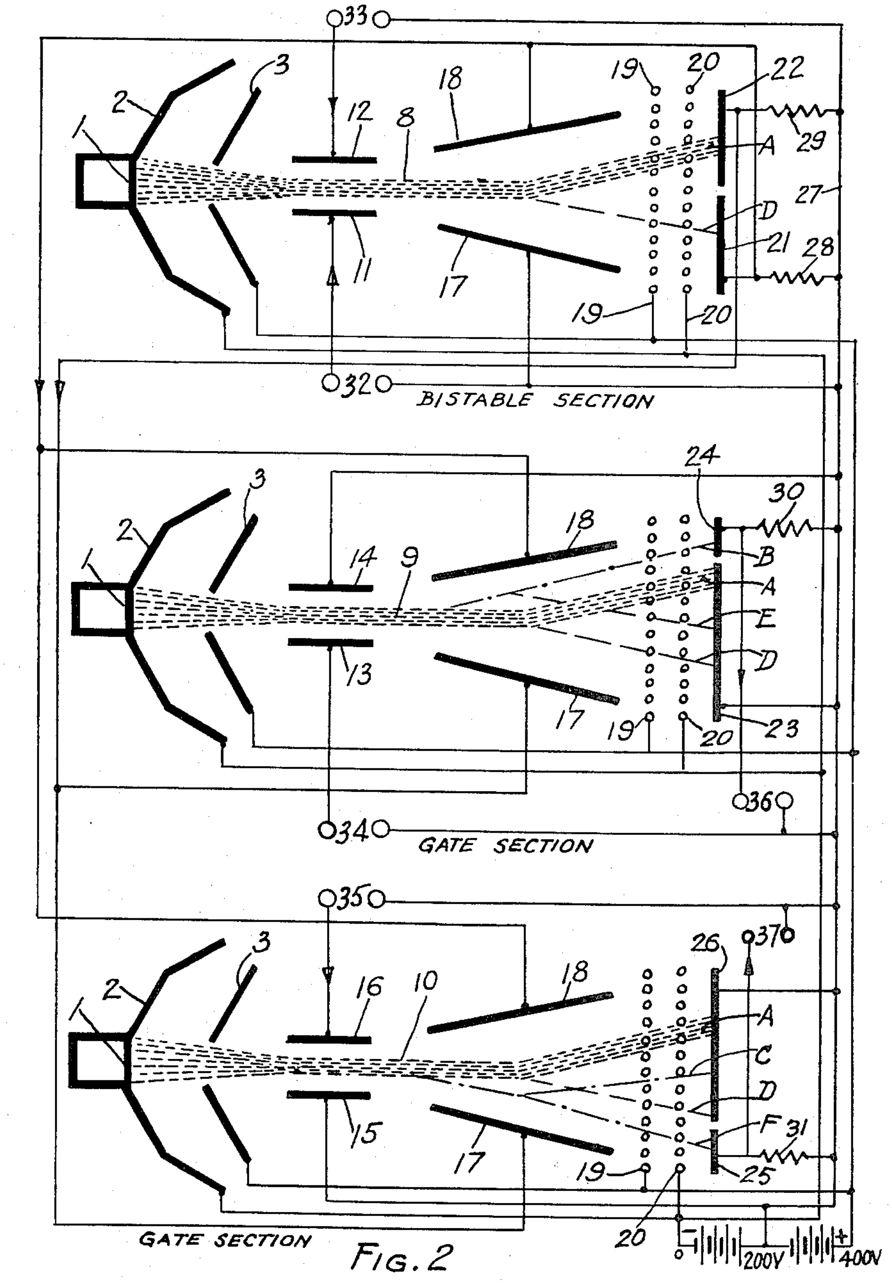
Figure 2 is a schematic circuit diagram of the connections of the tube shown in Figure 1.

A circuit arrangement for the tube is shown in Figure 2. For convenience in drawing, the cathode and anode parts, and also deflecting electrodes 17, 18 have been triplicated, but in the actual tube they are each constituted by a single electrode. The target parts 21, 22 are returned to a bus line 27 held at, say, 200 volts positive with respect to the cathode by way of resistances 28, 29, target parts 23, 26 are returned direct to the bus line 27, and target parts 24, 25 are returned to the bus line 27 by way of resistances 30, 31. Target part 21 is cross-connected to deflecting electrode 18 and target part 22 is cross-connected to deflecting electrode 17. Deflecting electrodes 14 and 15 are returned to the bus line 27. Control signals may be applied to electrodes 11 and 12 at terminals 32, 33 respectively. A first signal to be gated may be applied to deflecting elcterode 13 at terminals 34, and a second signal to be gated may be applied to deflecting electrode 16 at terminals 35.

The upper section of the tube including deflecting electrodes 11, 12 is the bi-stable element or section. Assume that the electron beam 8 falls wholly on target part 22. Then, due to the voltage drop across resistance 29, the potential of deflecting electrode 17 drops and holds the beam on target part 22. Conversely if the electron beam falls wholly on target part 21 it is held there by the voltage drop across resistance 28 applied to deflecting electrode 18. The electron beam 8 can be set to fall wholly on either of target parts 21, 22 by momentarily dropping the potential of deflecting electrodes 12, 11 respectively.

In the absence of signals to be gated applied to deflecting electrodes 13, 16 the electron beams 9, 10 are deflected similarly to electron beam 8. The division of targets 23, 24 and 25, 26, and the geometry of the tube is chosen so that beams 9, 10 in the gate sections lie just off one or other output target part 24, 25 in each state. Thus in the state shown in Figure 2 where the electron beam 8 occupies the position lettered A and falls wholly on target part 22, the electron beam 9 falls on the target part 23 adjacent the division between it and target part 24, but the beam 10 falls on target part 26 some distance from the division between it and target part 25: in the state where the beam 8 falls wholly on target part 21, shown by the dash line D, the beam 10 falls on target part 26 adjacent the division, whereas beam 9 falls on target part 23 at a point remote from its division.

Assume that, in the absence of signals applied to the terminals 34, 35 (which are therefore held at 200 v. positive with respect to the cathode), the electron beams have been brought to the position A by momentarily dropping the potential of deflecting electrode 11 by a control signal applied to terminals 32. If now a negative signal to be gated is applied to terminals 34 the electron beam 9 is deflected toward and onto the target part 24 to say the position B and an output signal appears at terminals 36. If a negative signal is applied to terminals 35, however, although the electron beam 10 is moved toward the target part 25, say to the position C, the movement is not sufficient to carry the electron beam off the target part 26 and onto the target part 25, so that no output signal appears at terminals 37. Thus the gate section associated with the electron beam 9 is open, but the gate section associated with beam 10 is closed. If however a control signal is now applied to terminals 33 the electron beams assume the positions D, as previously described, and negative signals applied to terminals 34, 35 will then move the beam to positions E and F respectively, so that an output signal will appear at terminals 37 but not at terminals 36. Thus when one gate section is open the other is closed, and control over which gate is open is exercised by control signals applied to terminals 32, 33 associated with the upper or first electron beam 8.

Figure 3:
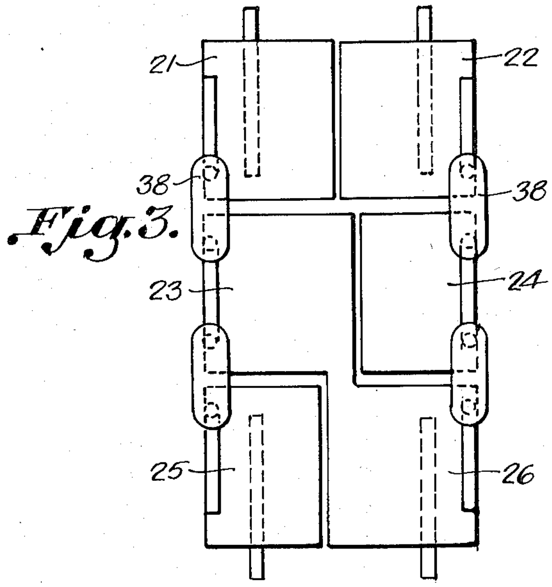
Figure 3 is an elevation of the target electrode arrangement in the tube of Figure 1.

While the leads to the target parts 23, 26 may be brought out separately, they may be connected internally, and a suitable target electrode construction in such a case is shown in plan in Figure 3. Glass beads supporting the electrodes are shown at 38. The scale is five times full size for a particular tube.

In the vacuum tube just described the bi-stable element is used to control two gates so that when one gate is open the other is closed, and vice versa. However for some applications only one gate is required, and in such cases one gate section, for example the lowermost or third section, may be omitted. Furthermore the deflecting electrodes 17, 18 which are common to the bi-stable section and the gate section or sections may be the first in order from the cathode, and not second as in Figures 1 and 2.

Figure 4:
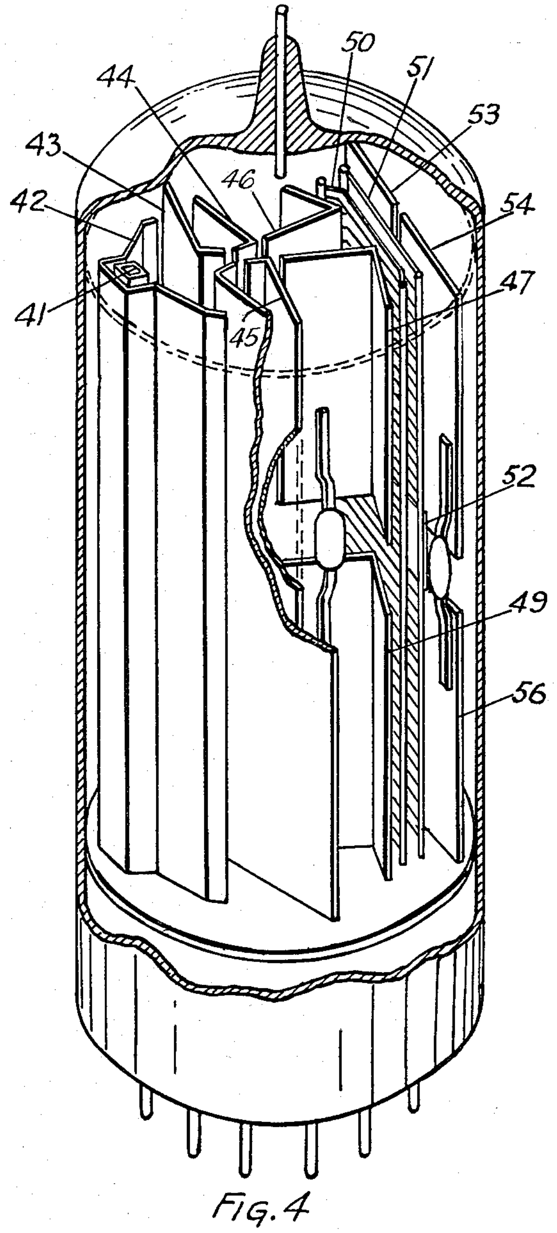
Figure 4 is a perspective view of a modified vacuum tube according to this invention including a single gating element only.

A modified vacuum tube consisting of a bi-stable section and a single gate section only is shown in Figure 4. An electron gun consisting of a cathode 41, cathode shield 42 and anode 43 produces a ribbon type electron beam. The electron beam passes through a first pair of deflecting electrodes 44, 45, which act on the whole length of the electron beam, and then through a second or upper pair of deflecting electrodes 46, 47 and a third or lower pair of deflecting electrodes 48, 49, of which only 49 is visible in Figure 1. The pairs of deflecting electrodes 46, 47 and 48, 49 are similar and are similarly placed with respect to the electron beam with one pair above and longitudinally spaced from the other: these pairs of deflecting electrodes act independently on their sections of the electron beam. The electron beam then passes through a screen grid 50 and a suppressor grid 51. The electron beam is divided into a first or upper section and a second or lower section by a solid strip 52 across the suppressor grid. The width of this strip is chosen with respect to the spacings between the pairs of deflectors to provide sufficient isolation between the sections. A divided target electrode consisting of target parts 53, 54 is provided for the first or upper section of the electron beam, and a second divided target electrode consisting of target parts 55, 56 of which only 56 is visible in Figure 1, is provided for the second or lower section of the electron beam. The target electrodes are divided longitudinally. The division in the lower section is centrally placed, and that in the upper section is offset, so that with all deflectors at the same potential the lower section of the beam divides substantially equally between the target parts 55, 56, and the upper section falls wholly on target part 53.

Figure 5:
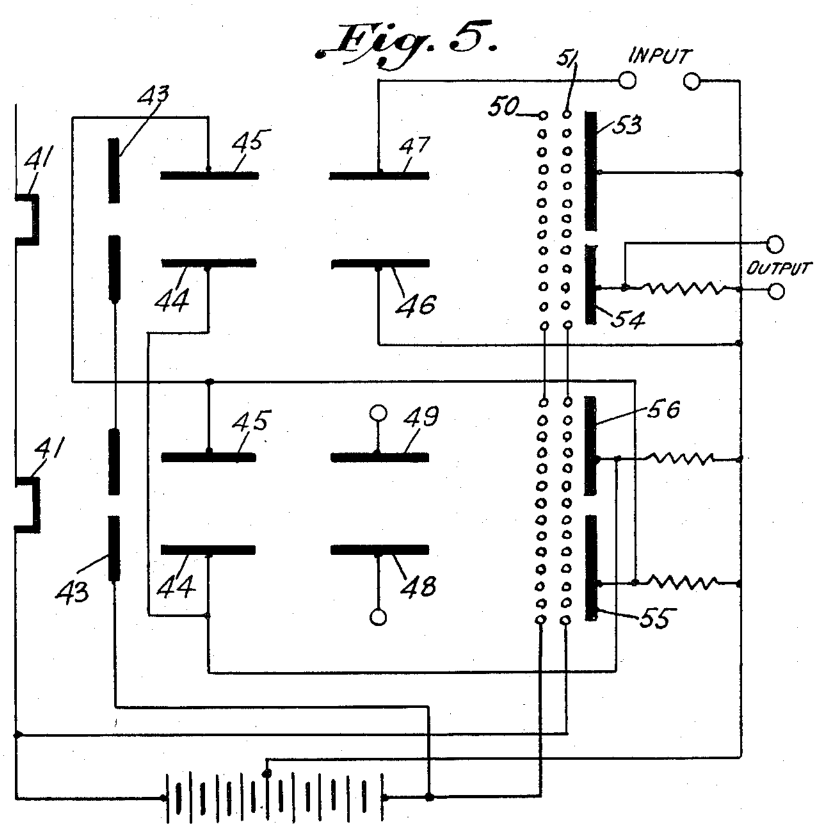
Figure 5 is a schematic circuit diagram of the connections of the tube shown in Figure 4.

A circuit diagram of the tube with a single gate section is shown in Figure 5. The operation of this tube will be obvious from the description given with respect to Figures 1 and 2.

What is claimed is:

1. An electron beam vacuum tube gate device comprising means for generating an electron beam, means for effectively dividing the electron beam into two sections; a bi-stable element including the first section of the electron beam and a divided target electrode cross-connected to a first pair of deflecting electrodes, said first pair of deflecting electrodes also operating to deflect the second section of the electron beam, a second pair of deflecting electrodes for the said first section of the electron beam, means for applying control signals to said second pair of deflecting electrodes whereby to shift the electron beam from one stable state where it falls on one part of the divided target to the other stable state where it falls on the other part of the divided target; a gating element including the said second section of the electron beam, the said first pair of deflecting electrodes, a divided target electrode for the said second section of the electron beam, and a further pair of deflecting electrodes for the said second section of the electron beam, the division between the parts of the last-mentioned target electrode and the potentials applied to the deflecting electrodes being such that in the absence of signals applied to the said further pair of deflecting electrodes the said second section of the electron beam falls on the same part of the target electrode in both of its stable positions, and means for applying gating signals to the said further deflecting electrodes whereby when the electron beam is in one stable state the gating signals transfer the said second section of the electron beam from the aforesaid "same" part of the target electrode for the gating element to the other part but when the electron beam is in the other stable state the gating signals do not so transfer the said second section of the electron beam.

2. An electron beam vacuum tube gate device comprising means for generating an electron beam, means for effectively dividing the electron beam into two sections, a first pair of deflecting electrodes associated with both sections of the electron beam, a second pair of deflecting electrodes associated with the first section of the electron beam, a target for the first section of the electron beam divided into two parts so that when all deflecting electrodes are at the same potential the said first section divides approximately equally between the said parts, resistances between the target parts and a high tension source, cross-connections between the said target parts and the said first pair of deflecting electrodes such that a target part on one side of the electron beam in its undeflected state is connected to the deflecting electrode of the said first pair on the opposite side, means for applying control signals to the said second pair of deflecting electrodes, whereby to provide a bi-stable element, a third pair of deflecting electrodes associated with the said second section of the electron beam, a target electrode for the second section of the electron beam divided into two parts such that when the bi-stable element is in one stable state the said second section of the electron beam falls on one part adjacent the division between the two parts and when the bi-stable element is in the other stable state the said second section of the electron beam falls on the said one part well away from the last-mentioned division, means for applying gating signals to the said third pair of deflecting electrodes to deflect the said second section of the electron beam toward the second part of the last-mentioned target electrode, and means for deriving an output from the last-mentioned second part of the target electrode for the second electron beam.

3. An electron beam vacuum tube gate device as claimed in claim 2 and including an electron gun for producing a ribbon type electron beam, a suppressor grid between the last of the deflecting electrodes and the target electrodes, and solid strips or plates secured to the suppressor grid to divide the electron beam into two sections.

4. An electron beam vacuum tube gate device comprising means for generating an electron beam, means for effectively dividing the electron beam into three sections; a bi-stable element including a first section of the electron beam and a divided target electrode cross-connected to a first pair of deflecting electrodes, said first pair of deflecting electrodes also operating to deflect the second and third sections of the electron beam, a second pair of deflecting electrodes for the said first section of the electron beam, means for applying control signals to said second pair of deflecting electrodes whereby to shift the electron beam from one stable state where it falls on one part of the divided target to the other stable state where it falls on the other part of the divided target; a first gating element including the second section of the electron beam, the said first pair of deflecting electrodes, a divider target electrode for the said second section of the electron beam, and a further pair of deflecting electrodes for the said second section of the electron beam, the division between the parts of the last-mentioned target electrode and the potentials applied to the deflecting electrodes being such that in the absence of signals applied to the said further pair of deflecting electrodes the said second section of the electron beam falls on the same part of the target electrode in both of its stable positions, and means for applying gating signals to said further deflecting electrodes whereby when the electron beam is in one stable state the gating signals transfer the said second section of the electron beam from the aforesaid "same" part of the target electrode for the first gating element to the other part but when the electron beam is in the other stable state the gating signals do not so transfer the said second section of the electron beam; and a second gating element including the third section of the electron beam, the said first pair of deflecting electrodes, a divided target electrode for the said third section of the electron beam, and a further pair of deflecting electrodes for the said third section of the electron beam, the division between the parts of the last-mentioned target electrode and the potentials applied to the deflecting electrodes being such that in the absence of signals applied to the last-mentioned further pair of deflecting electrodes the said third section of the electron beam falls on the same part of the target electrode therefore in both of its stable positions, and means for applying gating signals to said last-mentioned further deflecting electrodes whereby when the electron beam is in the aforesaid "other" stable state the gating signals transfer the said third section of the electron beam from the last-mentioned "same" part of the target electrode for the second gating element to the other part but when the electron beam is in the aforesaid "one" stable state the gating signals do not so transfer the said third section of the electron beam.

5. An electron beam vacuum tube gate device comprising means for generating an electron beam, means for effectively dividing the electron beam into three sections, a first pair of deflecting electrodes associated with all sections of the electron beam, a second pair of deflecting electrodes associated with the first section of the electron beam, a target for the first section of the electron beam divided into two parts so that when all deflecting electrodes are at the same potential the said first section divides approximately equally between the said parts, resistances between the target parts and a high tension source, cross-connections between the target parts and the said first pair of deflecting electrodes such that a target part on one side of the electron beam in its undeflected state is connected to the deflecting electrode of the said first pair on the opposite side, means for applying control signals to the said second pair of deflecting electrodes, whereby to provide a bi-stable element; a third pair of deflecting electrodes associated with the said second section of the electron beam, a target electrode for the second section of the electron beam divided into two parts such that when the bi-stable element is in one stable state the said second section of the electron beam falls on one part adjacent the division between the two parts and when the bi-stable element is in the other stable state the said second section of the electron beam falls on the said one part well away from the last-mentioned division, means for applying gating signals to the said third pair of deflecting electrodes to deflect the said second section of the electron beam toward the second part of the last-mentioned target-electrode; a fourth pair of deflecting electrodes associated with the said third section of the electron beam, a target electrode for the third section of the electron beam divided into two parts such that when the bi-stable element is in the said other stable state the said third section of the electron beam falls on one part adjacent the division between the two parts and when the bi-stable element is in the said one stable state the said third section of the electron beam falls on the last-mentioned one part well away from the last-mentioned division, means for applying gating signals to the said fourth pair of deflecting electrodes to deflect the said third section of the electron beam toward the second part of the last-mentioned target electrode; and means for deriving outputs from the target electrodes for the second and third sections of the electron beam.

6. An electron beam vacuum tube gate device as claimed in claim 5 including an electron gun for producing a ribbon type electron beam, the anode of the electron gun being pierced with rectangular openings to divide the electron beam into three sections, the divisions between the parts of the target electrodes being parallel to the longer dimensions of the electron beam.

7. An electron beam vacuum tube gate device as claimed in claim 6 wherein the division between the parts of the target electrode for the first section of the electron beam is substantially central, the division between the parts of the target electrode for the second section is off-set to one side of that for the first section, and the division between the parts of the target electrode for the third section is off-set to the other side of that for the first section.

8. An electron beam vacuum tube for use in gating circuits comprising an electron gun for generating a rectangular electron beam, means adapted effectively to divide the electron beam into two sections, a first pair of deflecting eletcrodes extending substantially the full length of the electron beam, a second pair of deflecting electrodes above the said dividing means, a first target electrode above the said dividing means which is divided into two parts by a centrally disposed division parallel to the longer dimensions of the electron gun, a third pair of deflecting electrodes below the said dividing means, and a second target electrode below the said dividing means which is divided into two parts by a division which is parallel to but off-set with relation to the division in the first-mentioned target electrode.

9. An electron beam vacuum tube for use in gating circuits comprising an electron gun for generating a rectangular electron beam, means adapted effectively to divide the electron beam into three sections, a first pair of deflecting electrodes extending substantially the full length of the electron beam, a second pair of deflecting electrodes for the first section of the electron beam only, a first target electrode for the first section of the electron beam which is divided into two parts by a centrally disposed division parallel to the longer dimension of the electron beam, a third pair of deflecting electrodes for the second section of the electron beam only, a second target electrode for the second section of the electron beam which is divided into two parts by a division which is parallel to but off-set with relation to the division in the first-mentioned target electrode, a fourth pair of deflecting electrodes for the third section of the electron beam only, a third target electrode for the third section of the electron beam which is divided into two parts by a division which is parallel to the division in the first-mentioned target electrode but off-set with relation thereto on the opposite side to that of the said second target electrode.

10. A gating circuit including a vacuum tube as claimed in claim 8 in which the parts of the target electrode for the first section of the electron beam are connected to a high tension source by resistances and are also cross-connected to the said first pair of deflecting electrodes whereby the said first section of the electron beam forms a bi-stable element controlling the second section of the electron beam, and gating impulses are applied to the said third pair of deflecting electrodes.

References Cited in the file of this patent

UNITED STATES PATENTS

| | | |
|---|---|---|
| 2,472,779 | Selgin | June 7, 1949 |
| 2,615,142 | Adler | Oct. 21, 1952 |